US009705832B2

(12) United States Patent
Waltermann et al.

(10) Patent No.: US 9,705,832 B2
(45) Date of Patent: Jul. 11, 2017

(54) CONTEXT-AWARE AGGREGATION OF TEXT-BASED MESSAGES

(71) Applicant: LENOVO (Singapore) PTE, LTD., New Tech Park (SG)

(72) Inventors: Rod D. Waltermann, Rougemont, NC (US); Nathan J. Peterson, Durham, NC (US); Russell Speight VanBlon, Raleigh, NC (US); John Carl Mese, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 332 days.

(21) Appl. No.: 14/470,710

(22) Filed: Aug. 27, 2014

(65) Prior Publication Data
US 2016/0065519 A1   Mar. 3, 2016

(51) Int. Cl.
G06F 15/16 (2006.01)
H04L 12/58 (2006.01)
H04L 29/08 (2006.01)

(52) U.S. Cl.
CPC ............ *H04L 51/16* (2013.01); *H04L 67/10* (2013.01)

(58) Field of Classification Search
None
See application file for complete search history.

(56) References Cited

U.S. PATENT DOCUMENTS

| 5,146,552 A * | 9/1992 | Cassorla | G06Q 10/10 715/200 |
| 8,463,648 B1 * | 6/2013 | Bierner | G06Q 30/02 705/14.44 |
| 9,148,397 B2 * | 9/2015 | Talwar | H04L 51/38 |
| 9,299,060 B2 * | 3/2016 | Panzer | G06Q 50/01 |
| 2003/0120720 A1 * | 6/2003 | Montero | H04L 29/06 709/203 |
| 2004/0221295 A1 * | 11/2004 | Kawai | G06Q 10/107 719/313 |
| 2009/0006375 A1 * | 1/2009 | Lax | H04N 21/435 |
| 2010/0082751 A1 * | 4/2010 | Meijer | G06F 15/16 709/206 |
| 2012/0124147 A1 * | 5/2012 | Hamlin | H04L 51/36 709/206 |

(Continued)

*Primary Examiner* — Viet Vu
*Assistant Examiner* — James Edwards
(74) *Attorney, Agent, or Firm* — Kunzler Law Group

(57) ABSTRACT

For automatically aggregating text-based messages together based on context, an apparatus for automatically identifying a topic of a reply message and associating the reply message with a conversation thread based on the topic is disclosed. The apparatus may include a processor and a memory that stores code executable by the processor, including code that identifies a messaging conversation between two or more messaging devices, code that determines a topic of a reply message in the messaging conversation, and code that associates the message with a conversation thread based on the topic. In one embodiment, the apparatus examines active applications on a messaging device composing the message and determines the topic based on the active applications. In one embodiment, the apparatus identifies an unanswered question and determines whether the reply message answers the unanswered question. A method and computer program product also perform the functions of the apparatus.

18 Claims, 6 Drawing Sheets

(56) References Cited

U.S. PATENT DOCUMENTS

| | | | |
|---|---|---|---|
| 2013/0007137 A1* | 1/2013 | Azzam | H04L 51/16 709/206 |
| 2013/0018909 A1* | 1/2013 | Dicker | G06Q 10/10 707/758 |
| 2013/0218885 A1* | 8/2013 | Satyanarayanan | G06Q 30/016 707/728 |
| 2014/0040769 A1* | 2/2014 | Lazaridis | G06F 3/0483 715/752 |
| 2014/0108309 A1* | 4/2014 | Frank | G06N 99/005 706/12 |
| 2014/0245178 A1* | 8/2014 | Smith | H04L 51/16 715/753 |
| 2015/0139415 A1* | 5/2015 | Skiba | H04M 3/42382 379/265.09 |
| 2015/0378577 A1* | 12/2015 | Lum | G06Q 10/10 715/720 |

\* cited by examiner

CONTEXT-AWARE AGGREGATION OF TEXT-BASED MESSAGES

BACKGROUND

Field

The subject matter disclosed herein relates to aggregating messages and more particularly relates to systems, apparatuses, and methods for automatically aggregating text-based messages together based on context.

Description of the Related Art

Today, electronic messaging services such as email, chat, SMS, Facebook, Instagram, etc. allow for multiple concurrent conversations between people. The non-real time nature of these messaging service makes it hard for a reader to understand what a sender is responding to. For example if the conversation is about going to a party, but drifts to food, and the sender replies yes (referring back to the party) it can be confusing to the reader. While conversation threading may clarify trends in a conversation, existing conversation threading mechanisms do not determine when to thread, or what a thread should contain.

BRIEF SUMMARY

An apparatus for automatically aggregating text-based messages together based on context is disclosed. A method and computer program product also perform the functions of the apparatus.

The apparatus may include a processor and a memory that stores code executable by the processor, including code that identifies a series of messages among two or more messaging devices, code that determines a topic of a message of the series of messages, and code that associates the message with a conversation thread based on the topic. The apparatus may be a device selected from the group consisting of: a receiving device, a sending device, and a messaging server.

In one embodiment, the code that determines the topic of a message may identify an unanswered question and determine a likelihood that the message answers the unanswered question. In another embodiment, the code that determines the topic of a message may automatically determine the topic of a latest message in response to an action selected from the group comprising sending, receiving, and composing the latest message.

In certain embodiments, the apparatus includes code that detects a reply message and automatically adds the reply message to a conversation thread based on context of the reply message. Also, the apparatus may include code that detects a change of topic within the series of messages and code that creates a new conversation thread in response to detecting the change of topic. In certain embodiments, the apparatus includes code that associates the message with another conversation thread based on user input.

In certain embodiments, the apparatus includes eye tracking code including code that tracks eye movement, code that determines a viewing location based on the eye movement, and code that identifies onscreen content corresponding to the viewing location, wherein determining the topic is based on the onscreen content. In certain embodiments, the apparatus includes code that examines active applications on a device composing the message, wherein determining the topic is based on the active applications.

In certain embodiments, the apparatus includes code that creates a data structure associating keywords with a particular conversation thread and code that matches content in the message with keywords of the data structure, wherein determining the viewing location is based on content in the message.

The method may include identifying, by use of a processor, a topic of a message in a series of messages among two or more messaging devices, determining whether the identified topic belongs to a message grouping associated with the series of messages, and associating the message with message grouping in response to determining that the message belongs to the conversation thread. In one embodiment, identifying a topic of the message includes identifying a cursor location of a messaging device composing the message. In another embodiment, identifying a topic of the message includes performing a natural language analysis of context of the message.

In certain embodiments, the method includes creating a new message grouping in response to determining that the message does not belong to any conversation threads associated with the series of messages and associating the message with the new conversation thread. The method may also include receiving audio data from a messaging device composing the message, wherein identifying a topic of the message comprises identifying the topic based on the received audio data.

In certain embodiments, the method includes creating a context stack for the series of messages, the context stack comprising context associated with each message of the series of messages, wherein determining whether the identified topic belongs to a message grouping comprises searching the context stack for context matching the identified topic. The method may also include associating keywords with each message in the series of messages, wherein determining whether the identified topic belongs to a message grouping comprises comparing the identified topic with the keywords.

The computer program product may include a computer readable storage medium that stores code executable by a processor to identify a latest message in conversation among two or more messaging devices, determine a topic of the latest message, and associate the latest message with a thread of the conversation based on the determined topic.

In certain embodiments, the computer program product includes identifying keywords for each of a plurality of threads associated with the conversation, wherein determining the topic comprises searching the message for keywords associated with a thread. In some embodiments, associating the latest message with a thread includes calculating a likelihood that topic of the latest message matches a theme of each thread associated with the conversation, identifying a particular thread having a highest calculated likelihood, comparing the highest calculated likelihood to a threshold, associating the latest message with the particular thread in response to the highest calculated likelihood exceeding the threshold, and associating the latest message with a new thread in response to the highest calculated likelihood not exceeding the threshold.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
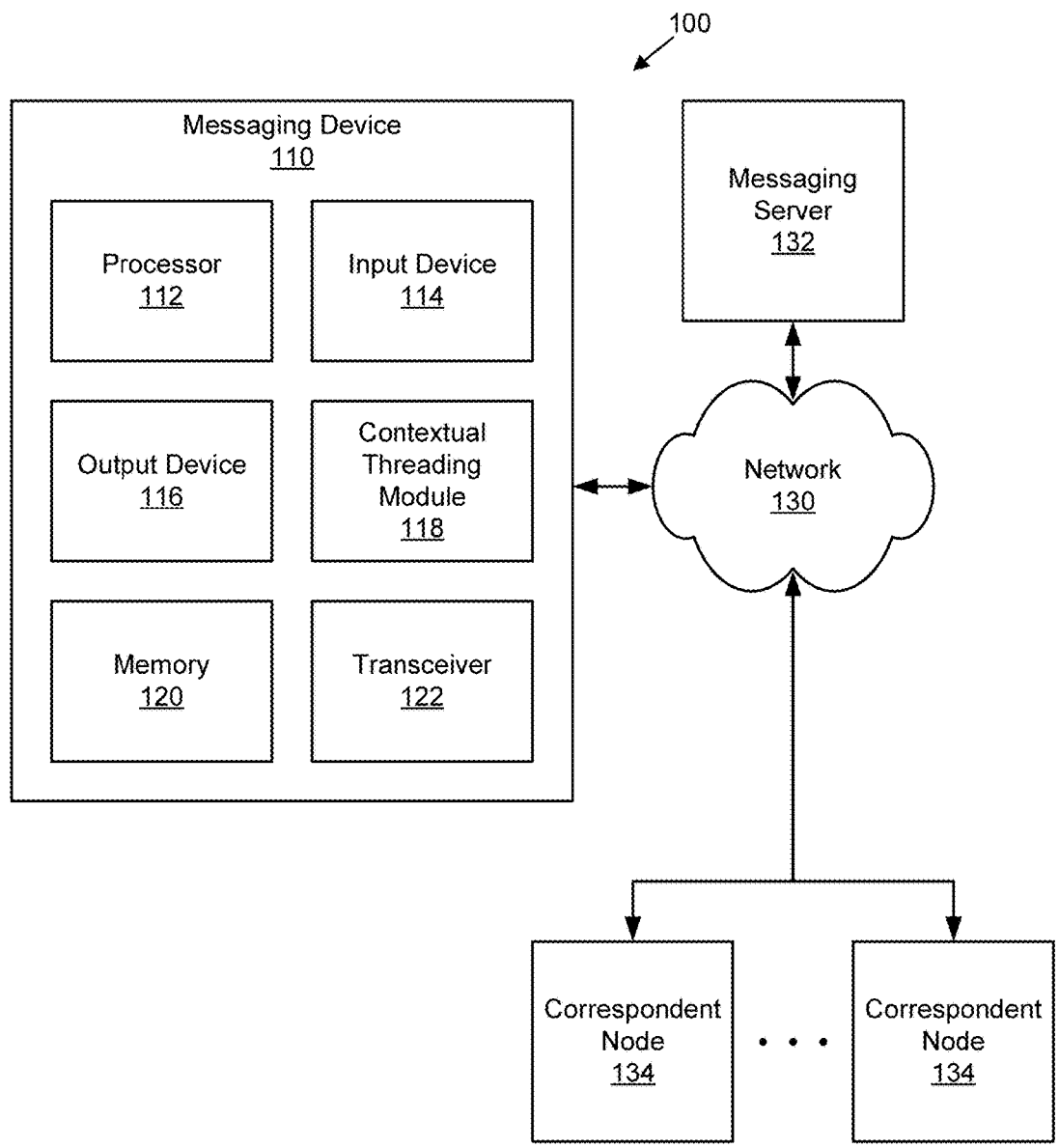
FIG. 1 is a schematic block diagram illustrating one embodiment of a system for automatically aggregating text-based messages together based on context.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products automatically aggregate text-based messages together based on context by identifying a topic of a message in a conversation between two or more messaging devices, determining whether the identified topic belongs to a conversation thread associated with the series of messages, and associating the message with the conversation thread in response to determining that the message belongs to the conversation thread, thereby automatically and intelligently categorizing the conversation into threads.

Techniques such as eye tracking, natural language processing, cursor location, and the like may be used to assist in categorizing the reply message. When a sender looks at a section of a message, and then starts to type a reply, the typing is categorized together with the section the user was looking at. Contextual fork detection is implemented by performing semantic and syntactic analysis, along with situational awareness to determine when a user has changed the topic in a conversation flow. The analysis may include components from all users who are participating in the conversation.

Some of the context switches may be easy to pick out as they are a change in topic, and can be gleaned from semantic analysis, while others may be more complex. For example, if a user sends a message, "My team just scored. It's now 3:5" in response to the score of the big game, the context of the message may be unclear and the category difficult to determine. Thus, environmental awareness may improve categorization. Continuing the example, if multiple participants in the conversation have the big game on their PC—or within range of audio, or camera vision—then this environmental information may be combined with language processing to determine the correct context of the message. This context is then matched with the message typed in a chat window (either by the user or another member of the chat session), and the message is added to an appropriate thread grouping if a high correlation match is made.

In some embodiments, the conversation threads are created and managed using a thread standard. For example, the messaging service may use the XMPP-201 specification, or other known standard for conversation threading. In other embodiments, the conversation threads are created using proprietary methods.

FIG. 1 depicts a system 100 for automatically aggregating text-based messages together based on context, according to embodiments of the disclosure. The system 100 includes a messaging device 110 and a plurality of correspondent nodes 134-138 communicatively coupled via a data network 130. In some embodiments, the system 100 also include a messaging server 132 that provides a messaging service among the messaging device 110 and the plurality of correspondent nodes 134-138.

The messaging device 110, in one embodiment, may be any device configured to compose, send, and receive messages via one or more messaging services. Examples of messaging devices include, but are not limited to, computer terminals, desktop computers, laptop computers, tablet computers, cellular phones, and the like. As depicted the messaging device 110 comprises a processor 112, an input device 114, an output device 116, a contextual threading module 118, a memory 120, and a transceiver 122. In some embodiments, the messaging device 110 includes a body or an enclosure, wherein the components of the messaging device 110 are contained within the enclosure. In some embodiments, the messaging device 110 includes a power source, for example a battery or a power adapter, which provides electrical power to components of the messaging device 110. In certain embodiments, the components of the messaging device 110 are communicatively coupled to each other, for example via a computer bus.

The processor 112, in one embodiment, may comprise any known controller capable of executing computer-readable instructions and/or capable of performing logical operations. For example, the processor 112 may be a microcontroller, a microprocessor, a central processing unit (CPU), a graphics processing unit (GPU), an auxiliary processing unit, a FPGA, or similar programmable controller. In some embodiments, the processor 112 executes instructions stored in the memory 120 to perform the methods and routines described herein. The processor 112 is communicatively coupled to the input device 114, the contextual threading module 118, the output device 116, and the memory 120.

The input device 114, in one embodiment, may comprise any known computer input device including a touch panel, a button, a keyboard, or the like. For example, the input device 114 may include a handwriting input unit operatively coupled to the processor 112. In some embodiments, the input device 114 may be integrated with the output device 116, for example, as a touchscreen or similar touch-sensitive display. In some embodiments, the input device 114 comprises a touchscreen such that text may be input by using a virtual keyboard displayed on the touchscreen and/or by handwriting on the touchscreen. In some embodiments, the input device 114 comprises two or more different devices, such as a keyboard and a touch panel.

In some embodiments, the input device 114 includes an audio data capture device such as a microphone or another device suitable for capturing audio external to the messaging device 110. In certain embodiments, the input device 114 includes an image data capture module, such as a digital camera or another device suitable for capturing visual data external to the messaging device 110. The input device 114 may include an eye tracking or face tracking module for capturing data relating to eye movement, eye position, and/or face position. In some embodiments, the eye tracking or face tracking module includes a digital camera and circuitry configured to identify eye position, and/or face position from image data captured by the digital camera. In further embodiments, the face tracking module may determine a user emotion from image data of a user's face. The user emotion may be used by the contextual threading module 118 to identify a topic and/or related thread for a reply message.

The output device 116, in one embodiment, is configured to output visual and/or audible signals. In some embodiments, the output device 116 includes an electronic display capable of outputting visual data to a user. For example, the output device 116 may include an LCD display, an LED display, an OLED display, a projector, or similar display device capable of outputting images, text, or the like to a user. In certain embodiments, the output device 116 includes one or more speakers for producing sound, such as an audible alert or notification.

In some embodiments, all or portions of the output device 116 may be integrated with the input device 114. For example, the input device 114 and output device 116 may form a touchscreen or similar touch-sensitive display. In other embodiments, the output device 116 may be located near the input device 114. The output device 116 may receive instructions and/or data for output from the processor 112 and/or the contextual threading module 118.

The contextual threading module 118, in one embodiment, is configured to identify a series of messages among two or more messaging devices, determine a topic of a particular message of the series of messages, and associate the particular message with a conversation thread (e.g., categorize the message) based on the topic. The particular message may be a latest message (e.g., a latest reply) in the series of messages (e.g., a non-real time conversation) and the contextual threading module 118 may automatically assign the message to a thread upon sending and/or receiving the latest message. In certain embodiments, the contextual threading module 118 dynamically categorizes the latest message as belonging to a certain thread during the composition of the message.

In some embodiments, the contextual threading module 118 categorizes the message based on a viewing location, a cursor location, message content, and/or non-message context. The non-message context may include audio clues detected by microphone at the messaging device 110, visual clues detected by camera at the messaging device 110, and/or media content presented by applications running on the messaging device 110. Information from various sources may be evaluated by the contextual threading module 118 to determine the correct context of the message. The contextual threading module 118 may then use the context to identify a thread to which the message belongs or, alternatively, create a new thread if the context doesn't match any existing threads.

The contextual threading module 118 may be comprised of computer hardware, computer software, or a combination of both computer hardware and computer software. For example, the contextual threading module 118 may comprise circuitry, or a processor, configured to identify a topic of a message based on audio or visual cues. As another example, the contextual threading module 118 may comprise computer program code that allows the processor 102 to identify a topic of a message based on a language analysis of the message. The contextual threading module 118 is discussed in further detail with reference to FIG. 2, below.

The memory 120, in one embodiment, is a computer readable storage medium. In some embodiments, the memory 120 includes volatile computer storage media. For example, the memory 120 may include a random access memory (RAM), including dynamic RAM (DRAM), synchronous dynamic RAM (SDRAM), and/or static RAM (SRAM). In some embodiments, the memory 120 includes non-volatile computer storage media. For example, the memory 120 may include a hard disk drive, a flash memory, or any other suitable non-volatile computer storage device. In some embodiments, the memory 120 includes both volatile and non-volatile computer storage media.

In some embodiments, the memory 120 stores data relating to automatically aggregating text-based messages together based on context. For example, the memory 120 may store messages, threads, conversations, user activity, user profiles, and the like. In some embodiments, the memory 120 also stores program code and related data, such as an operating system operating on the messaging device 110.

The transceiver 122, in one embodiment, is configured to send and to receive electronic communications via the network 130. In certain embodiments, the transceiver 122 is a wireless transceiver capable of exchanging information via electromagnetic radiation (e.g., communication via radio frequencies, infrared, visible light, and the like) or sound (e.g., ultrasonic communication). In certain embodiments, the processor 112 is a wired transceiver capable of exchanging information via a transmission line (e.g., wire, data cable, or optical fiber). In some embodiments, the transceiver 122 receives messages from the messaging server 132. In other embodiments, the transceiver 122 receives messages from one or more of the correspondent nodes 134.

The data network 130, in one embodiment, is a telecommunications network configured to allow the messaging device 110, the messaging server 132, and/or any of the correspondent nodes 134 to pass data to each other. The network 130 may be comprised of wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 130 may include a wide area network (WAN), a storage area network (SAN), a local area network (LAN), an optical fiber network, the internet, or other digital communication network. In some embodiments, the data network 130 may include two or more networks. The data network 130 may include one or more servers, routers, switches, and/or other networking equipment. The data network 130 may also include computer readable storage media, such as a hard disk drive, an optical drive, non-volatile memory, random access memory (RAM), or the like.

The messaging server 132, in one embodiment, is a server configured to support one or more messaging services. In some embodiments, the 132 may provide an internet-based messaging service. For example, the messaging device 110 and/or the correspondent nodes 134 may access the messaging service using a web browser or the like. Examples of messaging services that may be supported by the messaging server 132 include, but are not limited to, email, short messaging service (SMS), text messaging, multimedia messaging service (MMS), instant messaging, chat rooms, and the like.

In some embodiments, the messaging server 132 is configured to determine a topic of a reply message and associate the reply message with a conversation thread based on the topic. For example, the messaging server 132 may receive a reply message from a messaging client, determine the topic of the reply message, associate the reply message with a conversation thread based on the topic, and send both the reply message and an indication of the associated conversation thread to a recipient messaging client. As another example, the messaging server 132 may automatically associate the reply message with a conversation thread based on the topic and then send an indication of the associated conversation thread to the sending messaging client (i.e., the messaging client where the reply message was composed). In certain embodiments, the messaging server 132 may include a contextual threading module, such as the contextual threading module 118 in order to automatically and intelligently categorizing a conversation into threads.

The correspondent nodes 134, in one embodiment, are devices configured to send and receive messages via the network 130. For example, each correspondent node 134 may send a message to the messaging device 110, the messaging server 132, and/or to another correspondent node 134. The correspondent nodes 134 may access the network 130 via wired or wireless data links. In some embodiments, each correspondent node 134 is a messaging device comprising a processor, a memory, and a transceiver, similar to the messaging device 110. In certain embodiments, a correspondent node 134 may include a contextual threading module, such as the contextual threading module 118, in order to automatically and intelligently categorizing a conversation into threads. While only two correspondent nodes 134 are depicted in FIG. 1, in other embodiments, any number of correspondent nodes 134 may be included in the system 100.

In some embodiments, multiple correspondent nodes 134 may engage in simultaneous, or near simultaneous, conversation with the messaging device 110. For example, a first correspondent nodes 134 may be engaged in an email conversation with the messaging device 110 while a second correspondent node 134 may be engaged an instant messaging session with the messaging device 110. In some embodiments, the messaging device 110 and a plurality of correspondent nodes 134 may be engaged in the same conversation, such as an email exchange, chat room, or the like.

Figure 2:
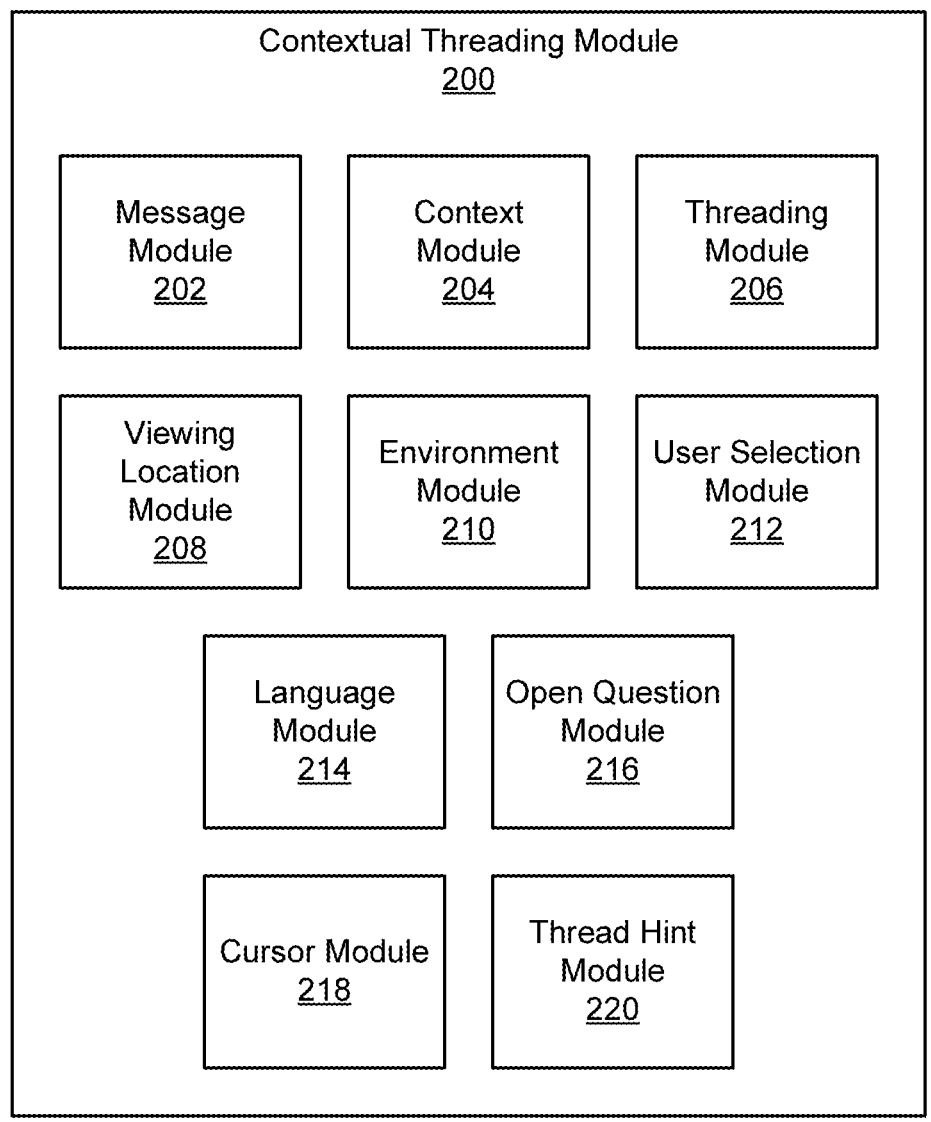
FIG. 2 is a schematic block diagram illustrating one embodiment of an apparatus for automatically aggregating text-based messages together based on context.

FIG. 2 depicts a contextual threading module 200 for automatically aggregating text-based messages together based on context, according to embodiments of the disclosure. In some embodiments, the contextual threading module 200 may be similar to, and perform the same functions as, the contextual threading module 118 described above with reference to FIG. 1. In some embodiments, the contextual threading module 200 may be part of a messaging device, such as the messaging device 110. In other embodiments, the contextual threading module 200 may be part of a messaging server, such as the messaging server 132 or a webmail server.

In general, as described above, the contextual threading module 200 detects a reply message and adds the reply message to a conversation thread based on context of the reply message, thereby automatically and intelligently categorizing the conversation into threads. [key dependent claims] The contextual threading module 200, in certain embodiments, is contained within one or more of a receiving device, a sending device, and a messaging server.

The contextual threading module 200, in one embodiment, includes message module 202, a context module 204, and a threading module 206. In some embodiments, the contextual threading module 200 also includes one or more of a viewing location module 208, an environment module 210, a user selection module 212, a language module 214, an open question module 216, and/or a cursor module 218. The modules of the contextual threading module 200 may be communicatively coupled to one another.

The message module 202, in one embodiment, is configured to identify a reply message in a conversation among two or more messaging devices. As used herein, a "conversation" refers to a series of messages among the two or more messaging devices. Also as used herein, a "reply message" refers any message in the conversation other than the initial message. In some embodiments, the reply message is the latest message in the conversation. Generally, the conversation is not real-time and has pauses between the reception of one message and the transmission of a reply message. Examples of reply message formats include, but are not limited to, text messages, emails, SMS (short message service) messages, IM (instant messaging) messages, chat messages, and the like. In certain embodiments, the message module 202 receives the reply message from a local or remote messaging client.

In some embodiments, a user holds multiple conversations concurrently and the message module 202 identifies an active conversation and one or more reply messages associated with the active conversation. The message module 202, in some embodiments, tracks an amount of elapsed time between composition and/or transmission of each reply message and a proceeding message in the same conversation. The elapsed time may be used, for example by the context module 204 and/or the threading module 206, to determine a likelihood that a topic of conversation has changed. In some embodiments, the message module 202 may track the number of other conversations a user participates in before composing a reply message for the first conversation. Tracking user participation in other conversations may include monitoring user inputs (e.g., mouse clicks, keystrokes, touch location, scrolling actions, etc.), cursor locations, active windows, or other metrics.

The context module 204, in one embodiment, is configured to determine a topic of the reply message. In some embodiments, the context module 204 evaluates a plurality of factors to determine the topic. For example, the context module 204 may evaluate language content of the reply message, cursor location prior to or during composition of the reply message, eye location prior to or during composition of the reply message, and external context such as audio and or visual data captured by the device composing the reply message. In certain embodiments, the context module 204 assigns different weight to the plurality of factors, for example based on a user profile. In other embodiments, the context module 204 evaluates a first set of factors, such as content of the message, and only evaluates additional factors if ambiguity exists after evaluating the first set of factors.

In some embodiments, the context module 204 receives context associated with the reply message and identifies the topic of the reply message based on received context. In some embodiments, the context module 204 received the context from a device composing the reply message. In other embodiments, the context module 204 receives the context from sensors communicatively coupled to the contextual threading module 200. In certain embodiments, the context includes a viewing location corresponding to a sender's gaze. In certain embodiments, the context includes audio data or visual data captured during composition of the reply message. The context module 204 may analyze the received context and include the received content in the evaluated factors.

In some embodiments, the context module 204 calculates a likelihood that the reply message pertains to a particular topic. For example, the context module 204 may employ a probability algorithm to calculate the likelihood of a particular topic based on evaluated factors. In some embodiments, the factors may be weighted when calculating the likelihood that the reply message includes the particular topic. The context module 204 may then select a most likely topic from a plurality of evaluated topics. In some embodiments, the likelihood is based, at least in part, on a user's profile. For example, a user's demographic, favorites, browsing history, and the like may be considered when calculating the likelihood that the reply message pertains to a particular topic.

In some embodiments, the context module 204 determines a plurality of topics for a particular reply message. For example, a message may begin with a first topic and end with a second topic. The context module 204 may independently evaluate different portions of the reply message and identify a topic for each evaluated portion. In certain embodiments, the context module 204 uses syntax, such as punctuation marks or whitespace, to identify separable portions of the message. In certain embodiments, the context module 204 may search for transitional phrases to identify separable portions of the reply message.

In some embodiments, the context module 204 identifies the topic of the reply message based on language content in the reply message. In some embodiments, the context module 204 may analyze the language content using a natural language algorithm. The natural language algorithm, in one embodiment, uses probabilistic methods to identify one or more topics from the language content of the message. In some embodiments, the context module 204 may search for keywords within the language content, the keywords being associated with particular topics. The context module 204 may identify a most likely topic based on keywords found within the language content of the reply message.

In some embodiments, the context module 204 identifies the topic of the reply message based on a syntactic analysis or a sematic analysis of the language content of the reply message. The syntactic analysis may involve parsing the reply message into discrete component, such as clause or phrases, and each component having a central idea (e.g., a keyword). The semantic analysis may involve identifying the central idea of each discrete component identified through the syntactic analysis.

In some embodiments, the context module 204 identifies a topic of the reply message based on a cursor location prior to or during composition of the reply message. The cursor location, for example a mouse location or a touch location, may be used to identify an onscreen region of interest. The context module 204 may then examine content in the region of interest to determine context for the reply message. For example, if the region of interest includes a previous message in the conversation, then the context module 204 may assign a higher likelihood that the reply message is in response to the previous message and thus shares a topic with the previous message. As another example, if the region of interest includes a weather application, then the context module 204 may assign an increased likelihood that the topic of the reply message include the weather.

In some embodiments, the context module 204 identifies the topic of the reply message based on a viewing location calculated from a user's eye movements. The context module 204 may receive eye data regarding positions and movements of the user's eyes and calculate an onscreen viewing location based on the eye data, the onscreen viewing location being a location where the user is looking. The context module 204 may then examine content in the onscreen viewing location to determine context for the reply message. For example, if the onscreen viewing location corresponds to location of a previous message in the conversation, then the context module 204 may assign a higher likelihood that the reply message is in response to the previous message and thus shares a topic with the previous message. As another example, if the onscreen viewing location corresponds to location of a score for a sporting event, then the context module 204 may assign an increased likelihood that the topic of the reply message include the sporting event.

In some embodiments, the context module 204 is configured to detect a change of topic within the conversation. In certain embodiments, the context module 204 may store a current topic in memory and may compare a determined topic to the stored current topic. In some embodiments, the context module 204 may indicate a change in topic to the threading module 206 if the two topics differ. In certain embodiments, the context module 204 may update the stored current topic if the two topics differ.

In certain embodiments, the context module 204 may calculate a likelihood that a topic has changed based on an elapsed time between the reply message and its preceding message. For example, a longer elapsed time may indicate a higher likelihood of a changed topic. In some embodiments, the context module 204 may assign a likelihood based on whether the elapsed time is less than a threshold response time. The threshold response time, in one embodiment, may be dynamically selected based on a length of the reply message, the context module 204 selecting a smaller threshold for shorter messages and a higher threshold for lengthier messages.

In some embodiments, the context module 204 stores the determined topic(s) in memory. For example, a table may be stored in memory containing an identifier for each message in the conversation and one or more topics corresponding to each message. The data structure may be accessed by components of the contextual threading module 200 to identify a topic of a particular message. In some embodiments, the context module 204 creates a context stack containing context and/or topics associated with each message in the conversation. The context stack may be ordered corresponding to the order in which messages are received.

The context module 204, in one embodiment, automatically determines the topic of a latest message in response to sending, receiving, and/or composing the latest message. For example, the context module 204 may be configured to receive an indication of an incoming message, for example from the message module 202, and to determine the topic of the incoming message in response to receiving the indication. As another example, the context module 204 may dynamically determine the topic of a message being composed. The context module 204 may be further configured to send an indication of the topic to a messaging server and/or to other devices participating in the conversation.

The threading module 206, in one embodiment, is configured to associate the reply message with a conversation thread based on the topic. As used herein, a "conversation thread" or "thread" refers to a grouping of messages within a conversation. In some embodiments, messages of the same thread are visually distinguished from other messages and threads, for example through color, font, size, emphasis, and/or style of the typeface. In some embodiments, the threading module 206 adds the reply message to an existing conversation thread having messages with topics similar to (or same as) the reply message. In other embodiments, the threading module 206 creates a new conversation thread and adds the reply message to the new thread in response to the topic of the reply message being sufficiently different than the topics of other messages in the conversation.

In some embodiments, a thread includes a main topic or theme and may also include closely related secondary topics. For example, a thread may relate to the topic of pets and closely related secondary topics of livestock, working animals, and/or laboratory animals. In other embodiments, a thread includes a main topic and one or more sub-topics. For example, a thread may relate to the sport of baseball and include sub-topics of leagues, teams, players, equipment, and the like. The threading module 206 may determine if the reply message should be associated with the thread based on whether the topic of the reply message is a secondary topic or sub-topic related to the main topic of the thread.

In some embodiments, the threading module 206 detects a change of topic within the conversation. In certain embodiments, the threading module 206 may compare topic(s) of a current thread to a determined topic of the reply message. Where the reply message topic differs from the current thread topic(s), the threading module 206 may associate the reply message with another (or a new) thread. In some embodiments, the threading module 206 searches content of the reply message for transitional phrases and/or syntax cues (e.g., punctuation marking) indicative of a change in topic and associates the reply message with another thread in response to detecting the change of topic.

In some embodiments, the threading module 206 associates the message with a conversation thread based on whether a topic of the reply message matches keywords associated with a particular conversation thread. In certain embodiments, the threading module 206 searches content of the reply message to identify a conversation thread to which the reply message may be associated. In certain embodiments, the threading module 206 associates the message with a conversation thread based on whether the identified topic of the reply message is found within a context stack for the conversation. In one embodiment, the threading module 206 may identify a conversation thread associated with a message having context and/or topic matching the reply message and then associate the reply message with the identified conversation thread.

In some embodiments, the threading module 206 associates the reply message with a thread using a hash table. The hash table is fed a key values, such as an identified topic of the reply message and/or keywords within the reply message, and uses a hash function to return an identifier of a thread. The threading module 206 then adds the reply message to the thread identified by the hash table. In certain embodiments, the hash table is selected based on predetermined topics and includes a number of predetermined thread identifiers. The threading module 206 may determine whether an active thread exists for a returned thread identifier and may create a new thread with the returned identifier if an active thread does not already exist.

In some embodiments, the threading module 206 calculates a likelihood that the topic of the reply message matches a thread theme (e.g., a primary topic, secondary topic, and/or a sub-topic associated with the thread). The likelihood may be based on a plurality of factors including a number of matching keywords between the topic and the thread theme and/or a degree of relatedness between the topic and the thread theme. The threading module 206 may then select a thread based on a strong likelihood that the topic of the reply message matches a thread theme (e.g., a high correlation between the topic and the thread theme). In some embodiments, the likelihood is based in part on a user's profile, including a user's demographic and/or past user corrections to a thread selected by the threading module 206.

In some embodiments, the threading module 206 identifies a particular thread having a highest calculated likelihood of matching the reply message topic. The threading module 206 may further compare the highest calculated likelihood to a threshold. If the highest calculated likelihood exceeds the threshold then the topic and the thread theme are sufficiently related and the threading module 206 associates the reply message with the particular thread having a highest calculated likelihood. Otherwise, if the likelihood is below the threshold, the topic and the thread theme are not sufficiently related and a new conversation thread is created, the new thread containing the reply message.

In some embodiments, the threading module 206 identifies an elapsed time between the reply message and a previous message in a thread. In some embodiments, a longer elapsed time indicates a higher likelihood of a changed topic. In some embodiments, an elapsed time less than a threshold response time indicates a high likelihood that the topic has changed. The threshold response time, in one embodiment, may be dynamically selected based on a length of the reply message, the threading module 206 selecting a smaller threshold for shorter messages and a higher threshold for lengthier messages.

In certain embodiments, the threading module 206 may add the reply message to two or more threads based on the reply message topic. For example, if the reply message includes more than one theme, then the reply message may be associated with multiple threads based on the multiple topics. In certain embodiments, the reply message may be associated with multiple threads based on converging topics of the multiple threads. For example, a thread having a family theme may converge with a thread having a baseball theme when the conversation turns to family members participating in a local baseball team. In some embodiments, the threading module 206 may merge the multiple threads in response to the merging topics. In other embodiments, the threading module 206 may maintain separate threads but indicate the reply message as belonging to multiple threads in response to the merging topics.

The viewing location module 208, in one embodiment, is configured to determine a viewing location based on the eye position and/or head position. In certain embodiments, the viewing location module 208 receives eye position data and/or head position data from an input device, such as the input device 114, communicatively coupled to the contextual threading module 200. In some embodiments, the viewing location module 208 tracks eye movement, eye position, and/or head position using a camera, an eye tracking system, or the like. The viewing location module 208 may then determine the viewing location based on the eye movement data, eye position data, and/or head position data.

In some embodiments, the viewing location module 208 identifies onscreen content corresponding to the viewing location. For example, the cursor module 218 may identify a window, panel, and/or frame corresponding to the viewing location. As another example, the cursor module 218 may identify an application having an interface displayed at the viewing location. As yet another example, the cursor module 218 may identify a previous message in the conversation displayed at the viewing location. In certain embodiments, the cursor module 218 then determines a context of the reply message (e.g., a setting or environment in which the reply message may be fully understood) based on the viewing location.

In some embodiments, the viewing location module 208 provides the context module 204 with a viewing location and/or context of the reply message determined from the viewing location. The context module 204 may then determine a topic of the reply message based on the viewing location and/or context of the reply message. While depicted as a separate module, in one embodiment the viewing location module 208 may be a component of the context module 204.

The environment module 210, in one embodiment, is configured to capture data regarding an environment of a messaging device composing the reply message. In some embodiments, the environment module 210 is further configured to analyze the captured environment data to determine a context of the reply message (e.g., a setting or environment in which the reply message may be fully understood). In some embodiments, the environment module 210 examines active applications and/or processes on the composing messaging device to determine a context of the reply message. In certain embodiments, the environment module 210 provides the context module 204 with information regarding what applications and/or processes are active and what content is being presented by the active applications and/or processes. The context module 204 may then determine a topic of the reply message based on the provided information.

In some embodiments, the environment module 210 receives audio data external to the composing messaging device the message. The audio data, in one embodiment, is captured by a microphone or other suitable audio input device. The environment module 210 may analyze the audio data to determine a context of the reply message. In certain embodiments, the environment module 210 provides the context module 204 with information regarding what applications and/or processes are active and what content is being presented by the active applications and/or processes. The context module 204 may then determine a topic of the reply message based on the provided information. While depicted as a separate module, in one embodiment the environment module 210 may be a component of the context module 204.

The user selection module 212, in one embodiment, is configured to receive a user input selecting a thread to which the reply message belongs. In some embodiments, the user indicates a correction to the thread associated with the reply message via the user selection module 212. In some embodiments, the user selection module 212 receives user input via the processor 112, the input device 114, and/or the transceiver 122. The user selection module 212 may then instruct the threading module 206 to associate the reply message with the selected conversation thread based on the user input. While depicted as a separate module, in one embodiment the viewing location module 208 may be a component of the threading module 206.

In some embodiments, the user selection module 212 adjusts the context module 204 and/or the threading module 206 based on the user selection to improve accuracy. For example, a model used by the context module 204 to determine the topic may be adjusted based on the user selection. As another example, the context module 204 and/or the threading module 206 may evaluate different factors or adjust a weight given to certain factors based on the user selection. In certain embodiments, the user selection module 212 incorporates the user selections in a user specific model. In certain embodiments, the user selection module 212 stores the user selections in a user specific database. For example, a user profile may include data regarding user corrections and the context module 204 and/or threading module 206 may select topics and/or conversation threads based on the user profile.

The language module 214, in one embodiment, is configured to perform a natural language analysis of content of the reply message. The natural language analysis may be based on statistical, probabilistic, and/or stochastic methods. In some embodiments, the language module 214 identifies keywords within the reply message. The language module 214 may then compare the identified keywords to a keywords associated with a particular topic to match a topic with the content of the reply message.

In some embodiments, the language module 214 performs a syntactic analysis of the reply message. The language module 214 may parse the reply message into discrete component, such as clause or phrases, and each component having a central idea (e.g., a keyword). In certain embodiments, the language module 214 may parse the reply message according to grammatical rules. In certain embodiments, the language module 214 may parse the reply message based on punctuation marks and/or on whitespace.

In some embodiments, the language module 214 performs a semantic analysis of the reply message to identify an intended meaning of the reply message. The language module 214 may identify the central idea of each discrete component identified through a syntactic analysis. The language module 214 may further determine whether discrete components relate to the same subject to ascertain whether multiple topics are present in the reply message. In some embodiments, the language module 214 identifies multiple possible meanings of the reply message and assigns a probability to each possible meaning based on the semantic analysis. The language module 214 may then identify the intended meaning based on a highest of the assigned probabilities.

In some embodiments, the language module 214 creates a data structure containing keywords and/or intended meanings of the reply message. In certain embodiments, the language module 214 stores the keywords and/or intended meanings of the reply message in the context stack. In certain embodiments, the language module 214 matches keywords of the data structure with keywords associated with a particular conversation thread. The language module 214 may provide information regarding the match to the threading module 206, wherein the threading module 206 may associate the reply message with the particular conversation thread based on the provided information.

In some embodiments, the language module 214 identifies a keyword for each message in the conversation, wherein the threading module 206 determines whether the reply message belongs to a particular thread by comparing a topic of the reply message with the keywords of each message of the particular thread. While depicted as a separate module, in one embodiment the language module 214 may be a component of the context module 204 and/or the threading module 206.

The open question module 216, in one embodiment, is configured to identify an open question in the conversation. As used herein, an "open" question refers to a question included in a previous message of the conversation that has not been answered or for which additional responses may be expected. In some embodiments, the open question module 216 identifies open questions through natural language analysis of the conversation. In further embodiments, the open question module 216 identifies an open question based on an amount of elapsed time between a message including the question and subsequently received messages.

The open question module 216 may determine a likelihood that the reply message answers an open question. In some embodiments, the open question module 216 assigns a higher probability where the open question is a recent, unanswered question. In some embodiments, the open question module 216 assigns a lower probability where the elapsed time between the reply message (being evaluated) and the message containing the open question. In further embodiments, the open question module 216 may assign a lower probability as a number of messages between the reply message and the message containing the open question increases. In certain embodiments, the context module 204 and/or the threading module 206 may use the likelihood determined by the open question module 216 in deciding whether the reply message shares a topic with the message containing the open question and/or belongs to the same thread as the message containing the open question. While depicted as a separate module, in one embodiment the open question module 216 may be a component of the context module 204 and/or the threading module 206.

The cursor module 218, in one embodiment, is configured to identify a cursor location of a messaging device composing the message. The cursor location may correspond to a computer mouse location, a touch location (e.g., for a touchscreen device), or the like. In some embodiments, the cursor module 218 receives cursor location data from the processor 112, the input device 114, and/or the memory 120. The cursor module 218 may identify a cursor location prior to or during composition of the reply message based on the received cursor data.

In some embodiments, the cursor module 218 is further configured to identify a region of interest surrounding the cursor location. For example, the cursor module 218 may identify a window, panel, and/or frame corresponding to the cursor location. As another example, the cursor module 218 may identify an application having an interface displayed at the cursor location. As yet another example, the cursor module 218 may identify a previous message in the conversation displayed at the cursor location. In certain embodiments, the cursor module 218 then determines a context of the reply message (e.g., a setting or environment in which the reply message may be fully understood) based on the region of interest.

In some embodiments, the cursor module 218 provides the context module 204 with information regarding a cursor location, a region of interest, and/or context of the reply message determined from the region of interest. The context module 204 may then determine a topic of the reply message based on the provided information. While depicted as a separate module, in one embodiment the cursor module 218 may be a component of the context module 204.

Figure 3B:
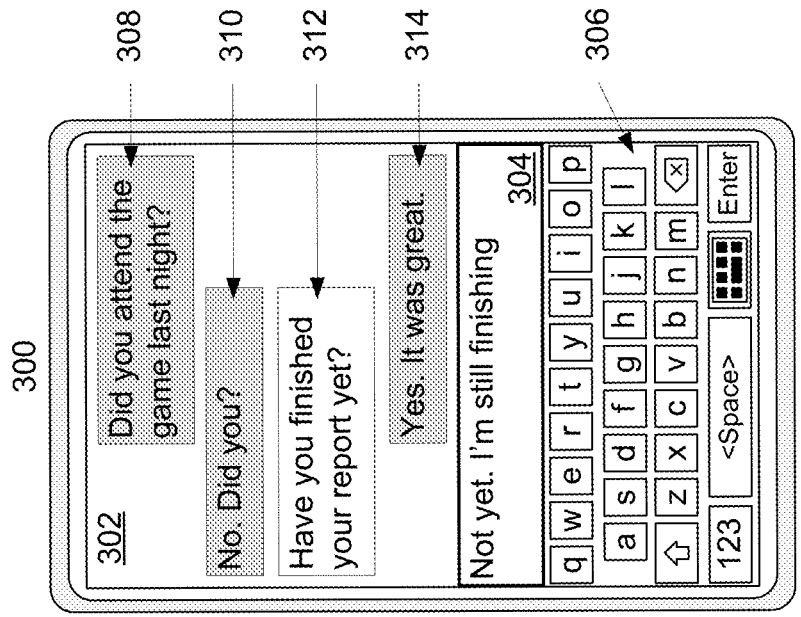
FIG. 3B is a diagram illustrating another embodiment of an apparatus for automatically aggregating text-based messages together based on context.
Figure 3A:
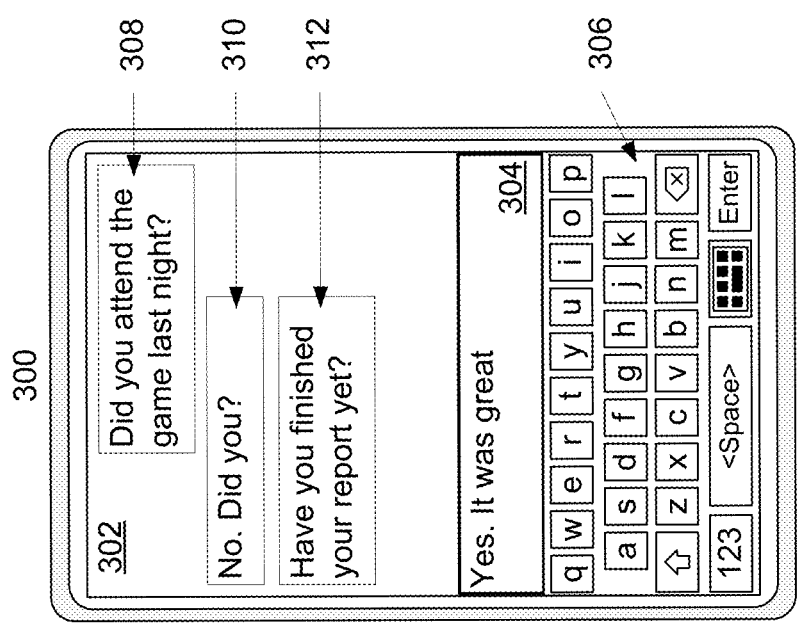
FIG. 3A is a diagram illustrating one embodiment of an apparatus for automatically aggregating text-based messages together based on context.

The thread hint module 220, in one embodiment, is configured to communicate context hints with a messaging server and/or to a correspondent node. The context hints may include internal context, such as active applications on the composing messaging device, and/or external context, such as audio/visual data captured by the composing messaging device. In some embodiments, the thread hint module 220 also communicates a thread association for the reply message. In some embodiments, the thread hint module 220 receives a context hint and/or a thread association concurrently with the reply message. In certain embodiments, the contextual threading module 200 is part of a messaging server and the thread hint module 220 pushes context hints and/or thread associations to messaging clients, such as the messaging device 110 and/or the correspondent node 134. In other embodiments, the contextual threading module 200 is a composing messaging device and the thread hint module 220 sends a context hint and/or a thread association concurrently with the reply message. In some embodiments, the thread hint module 220 communicates FIG. 3A-3B depict a contextual threading device 300 for automatically aggregating text-based messages together based on context, according to embodiments of the disclosure. The contextual threading device 300 identifies a topic of a message in a conversation between two or more messaging devices, determines whether the identified topic belongs to a conversation thread associated with the series of messages, and associates the message with the conversation thread in response to determining that the message belongs to the conversation thread, thereby automatically and intelligently categorizing the conversation into threads. The contextual threading device 300 may be similar to the messaging device 110 and/or the contextual threading module 200 described above with reference to FIGS. 1 and 2.

The contextual threading device 300 may include a display (e.g., a touchscreen display) with a conversation region 302 for displaying messages and a composition region 304. In some embodiments, the contextual threading device 300 also includes a virtual keyboard 306. In some embodiments, the contextual threading device 300 may also include one or more of a processor, a memory, and/or a contextual threading module, as described above with reference to FIG. 1-2.

FIG. 3A depicts the contextual threading device 300 displaying a conversation to between a first user and a second user. The conversation includes a first message 308 authored by the first user, a second message 310 authored by the second user, and a third message 312 authored by the second user. At this point, a user is composing a reply message in the composition region 304. As depicted the first message 308 and the second message 310 are related to whether the conversation participants attended a sporting event. However, the third message 312 relates to whether the first user has completed a report. Here, the third message 312 is received before the first user can respond to a question asked in a previous message (e.g., in second message 310). Accordingly, the first reply message being composed may not clearly indicate to the second user which question is being answered.

The contextual threading device 300 may examine the language of the messages 308-312 to identify topics for these messages. The contextual threading device 300 may further create a message thread for messages of the same topic. In some embodiments, the contextual threading device 300 categorizes the first message 308 and the second message 310 as having the same topic and adds both to the same thread. However, the contextual threading device 300 may determine that the third message 312 relates to a different topic than the previous messages and thus may begin a new thread that includes third message 312.

In certain embodiments, the contextual threading device 300 determines a topic of the first reply message in response to the first user composing the first reply message. In other embodiments, the contextual threading device 300 may determine the topic after sending (or receiving an instruction to send) the first reply message. In some embodiments, the contextual threading device 300 first examines the language of the first reply message to determine its topic. However, as depicted the language of the first reply message is ambiguous and does not clearly indicate a topic. Thus, the contextual threading device 300 may examine additional data related to the first reply message to determine a topic.

In some embodiments, the contextual threading device 300 analyzes eye and/or face data to determine that the first user was looking at the second message 310 immediately prior to composing the first reply message. The contextual threading device 300 may thus determine that the topic of the first reply message is likely to be the same as that of the second message 310. In some embodiments, the contextual threading device 300 may analyze timestamps associated with the messages to determine that the third message 312 was received after the user began to type the first reply message. The contextual threading device 300 may thus determine that the topic of the first reply message is unlikely to be the same as that of the third message 312.

FIG. 3B depicts the contextual threading device 300 after the first user has sent a fourth message 314 (e.g., corresponding to the first reply message) and while composing a second reply message at the composition region 304. Here, the contextual threading device 300 has identified the topic of the fourth message 314 and determined that the fourth message 314 belongs with a thread including the first message 308 and the second message 310, as all three messages share a common topic. The contextual threading device 300 then adds the fourth message 314 to the proper thread. As depicted, the contextual threading device 300 may visually distinguish the threads of the conversation by using different colors, fonts, backgrounds, or the like for the different threads.

Additionally, as the first user is composing the second reply message, the contextual threading device 300 may determine a topic of the second reply message and/or gather data relating to the environment of the contextual threading device 300 (e.g., eye data, face data, or the like). Here, the contextual threading device 300 may identify that the topic of the second reply message is the report and, upon sending, may add the second reply message to the thread containing the third message 312.

Figure 4:
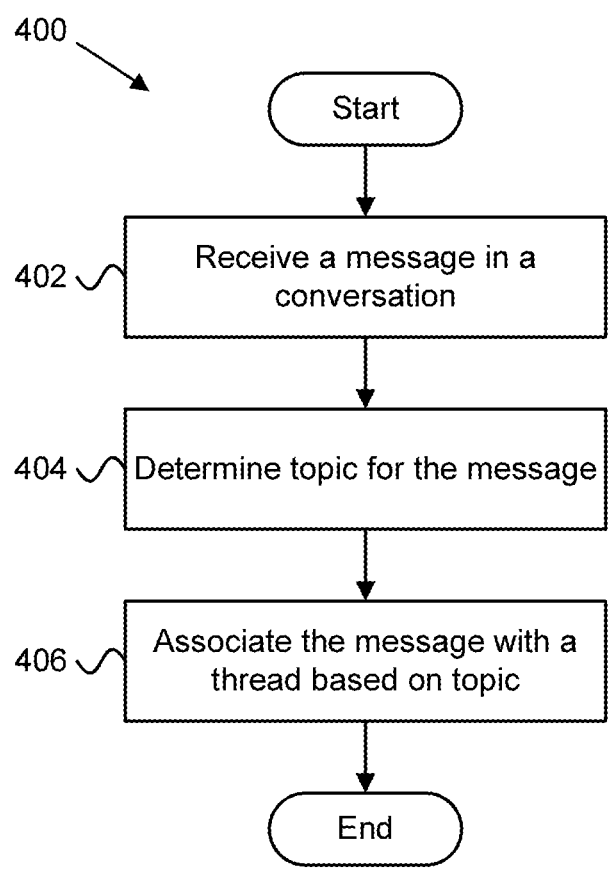
FIG. 4 is a schematic flow chart diagram illustrating one embodiment of a method for automatically aggregating text-based messages together based on context.

FIG. 4 depicts a method 400 for automatically aggregating text-based messages together based on context, according to embodiments of the disclosure. In some embodiments, the method 400 is performed using a messaging device, such as the contextual threading module 118, the contextual threading module 200, and/or the contextual threading device 300 described above with reference to FIGS. 1-2 and 3A-3D. In some embodiments, the method 400 is performed by a processor, such as a microcontroller, a microprocessor, a central processing unit (CPU), a graphics processing unit (GPU), an auxiliary processing unit, a FPGA, or the like.

The method 400 begins with the messaging device receiving 402 a message in an electronic conversation. In certain embodiments, the message is a reply message or a latest message in the conversation. In some embodiments, the conversation is a non-real time conversation between two or more messaging devices. In some embodiments, receiving 402 the message includes identifying a reply message (e.g., a latest message) in the conversation.

Next, the messaging device determines 404 a topic for the message. In some embodiments determining 404 the topic includes evaluating a plurality of factors. For example, determining 404 the topic may include analyzing language content of the message, cursor location prior to or during composition of the message, eye location prior to or during composition of the message, and external context such as audio and or visual data captured by the device composing the message. In certain embodiments, the different weights are assigned to the plurality of factors, for example based on a user profile.

In certain embodiments, determining 404 the topic may include analyzing received context. In some embodiments, determining 404 the topic includes receiving context associated with the message and identifying the topic based on received context, such as context received from a device composing the message. In other embodiments, determining 404 the topic includes receiving the context from sensors communicatively coupled to the messaging device. In certain embodiments, the context includes a viewing location corresponding to a sender's gaze. In certain embodiments, the context includes audio data or visual data captured during composition of the reply message.

The messaging device then associates 406 the message with a conversation thread based on the determined topic. In some embodiments, associating 406 the message includes adding the message to an existing conversation thread having messages with topics similar to (or same as) the message. In other embodiments, associating 406 the message includes creating a new conversation thread and adding the message to the new thread in response to the topic of the message being sufficiently different than the topics of other messages in the conversation. The method 400 ends.

Figure 5:
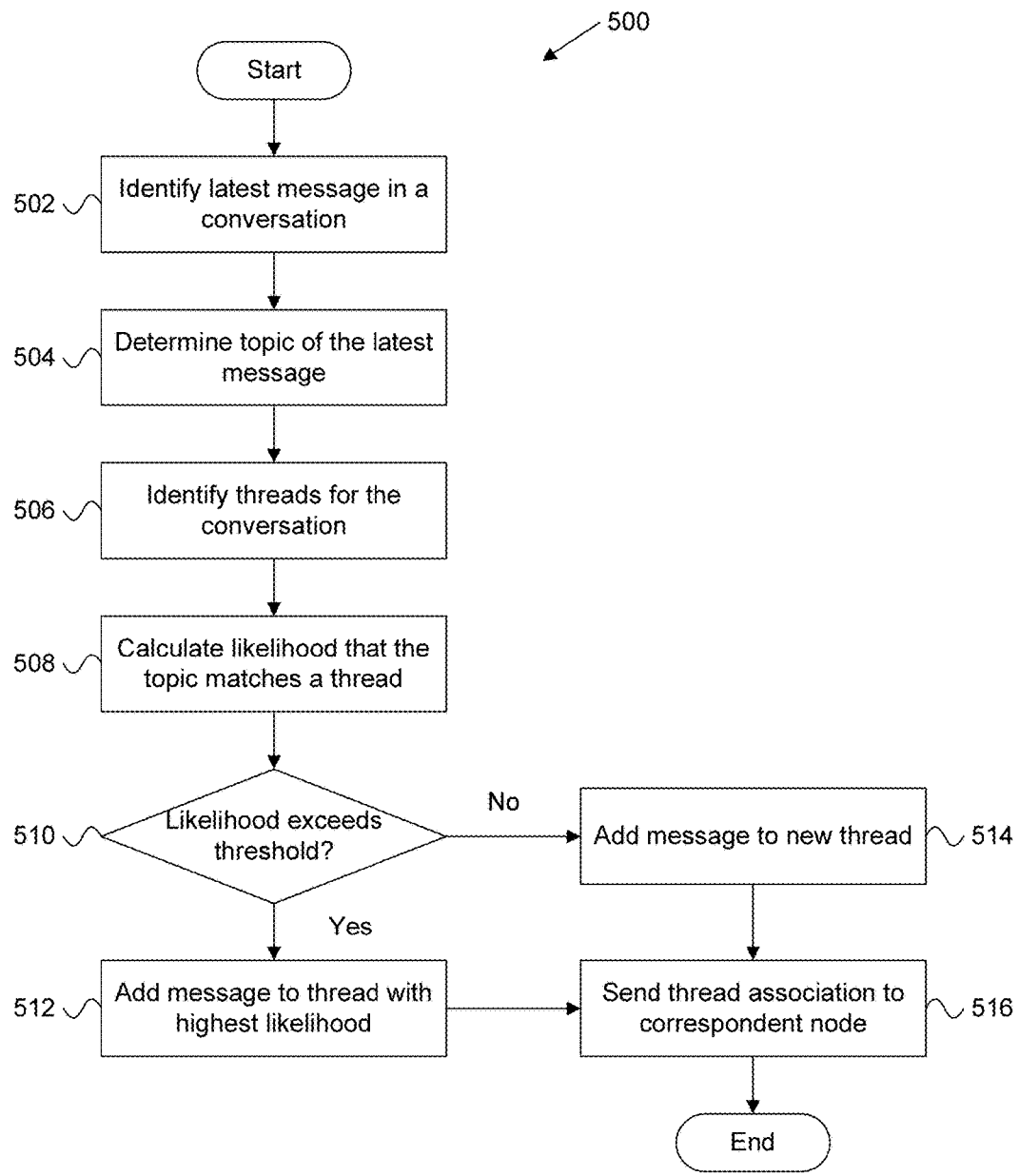
FIG. 5 is a schematic flow chart diagram illustrating another embodiment of a method for automatically aggregating text-based messages together based on context.

FIG. 5 depicts a method 500 for automatically aggregating text-based messages together based on context, according to embodiments of the disclosure. In some embodiments, the method 500 is performed using a messaging device, such as the contextual threading module 118, the contextual threading module 200, and/or the contextual threading device 300 described above with reference to FIGS. 1-2 and 3A-3D. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins with the messaging device identifying 502 a latest message in a conversation. In certain embodiments, the message is a reply message or a latest message in the conversation. In some embodiments, the conversation is a non-real time conversation between two or more messaging devices. In some embodiments, identifying 502 the latest message includes receiving a reply message from a messaging device participating in the conversation.

Next, the messaging device determines 504 a topic of the latest message. In some embodiments determining 504 the topic includes evaluating a plurality of factors. For example, determining 504 the topic may include analyzing language content of the message, cursor location prior to or during composition of the message, eye location prior to or during composition of the message, and external context such as audio and or visual data captured by the device composing the message. In certain embodiments, the different weights are assigned to the plurality of factors, for example based on a user profile.

In certain embodiments, determining 504 the topic may include analyzing received context. In some embodiments, determining 504 the topic includes receiving context associated with the message and identifying the topic based on received context, such as context received from a device composing the message. In other embodiments, determining 504 the topic includes receiving the context from sensors communicatively coupled to the messaging device. In certain embodiments, the context includes a viewing location corresponding to a sender's gaze. In certain embodiments, the context includes audio data or visual data captured during composition of the reply message.

The messaging device proceeds to identify 506 threads in the conversation. In some embodiments, messages of the same thread are visually distinguished from other messages and threads, for example through color, font, size, emphasis, and/or style of the typeface. In some embodiments, identifying 506 threads in the conversation includes searching a data structure associated with the conversation thread to obtain an identifier for the threads in the conversation. In some embodiments, identifying 506 threads in the conversation includes identifying a main topic, or theme, of the thread and any secondary topics or sub-topics associated with the thread.

The messaging device then calculates 508, for each thread, a likelihood that the topic of the latest message matches the thread. In some embodiments, calculating 508 the likelihood of the latest message matching the thread includes comparing the topic of the latest message to a primary topic, a secondary topic, and/or a sub-topic associated with the thread. The likelihood may be based on a plurality of factors including a number of matching keywords between the topic and the thread theme and/or a degree of relatedness between the topic and the thread theme. In some embodiments, the likelihood is based in part on a user's profile.

In some embodiments, calculating 508 the likelihood of the latest message matching the thread includes identifying an elapsed time between the latest message and a previous message in a thread. In certain embodiments, a longer elapsed time indicates a lower likelihood of the latest message matching the thread. In certain embodiments, an elapsed time less than a threshold response time indicates a low likelihood that the latest message matches the thread.

Next, the messaging device determines 510 whether a calculated likelihood exceeds a threshold value. In some embodiments, determining 510 whether a calculated likelihood exceeds a threshold value includes identifying a particular thread having a highest calculated likelihood of matching the reply message topic and comparing the highest calculated likelihood to the threshold. If the likelihood exceeds the threshold value, then the messaging device adds 512 the latest message to the thread having the highest likelihood. Otherwise, if the likelihood does not exceed the threshold value, the messaging device creates a new thread and adds 514 the latest message to the new thread.

The messaging device then sends 516 information regarding the thread association to a correspondent node participating the conversation. The thread association indicates a particular thread to which the latest message is added. In some embodiments, the information may include thread identifier. The information may also include an indication that a new thread has been created. In certain embodiments, sending 516 information regarding the thread association includes pushing the thread association to a messaging client. In other embodiments, sending 516 information regarding the thread association includes uploading the thread association to a server. In some embodiments, sending 516 information regarding the thread association occurs concurrently with sending the latest message. The method 500 ends.

Figure 6:
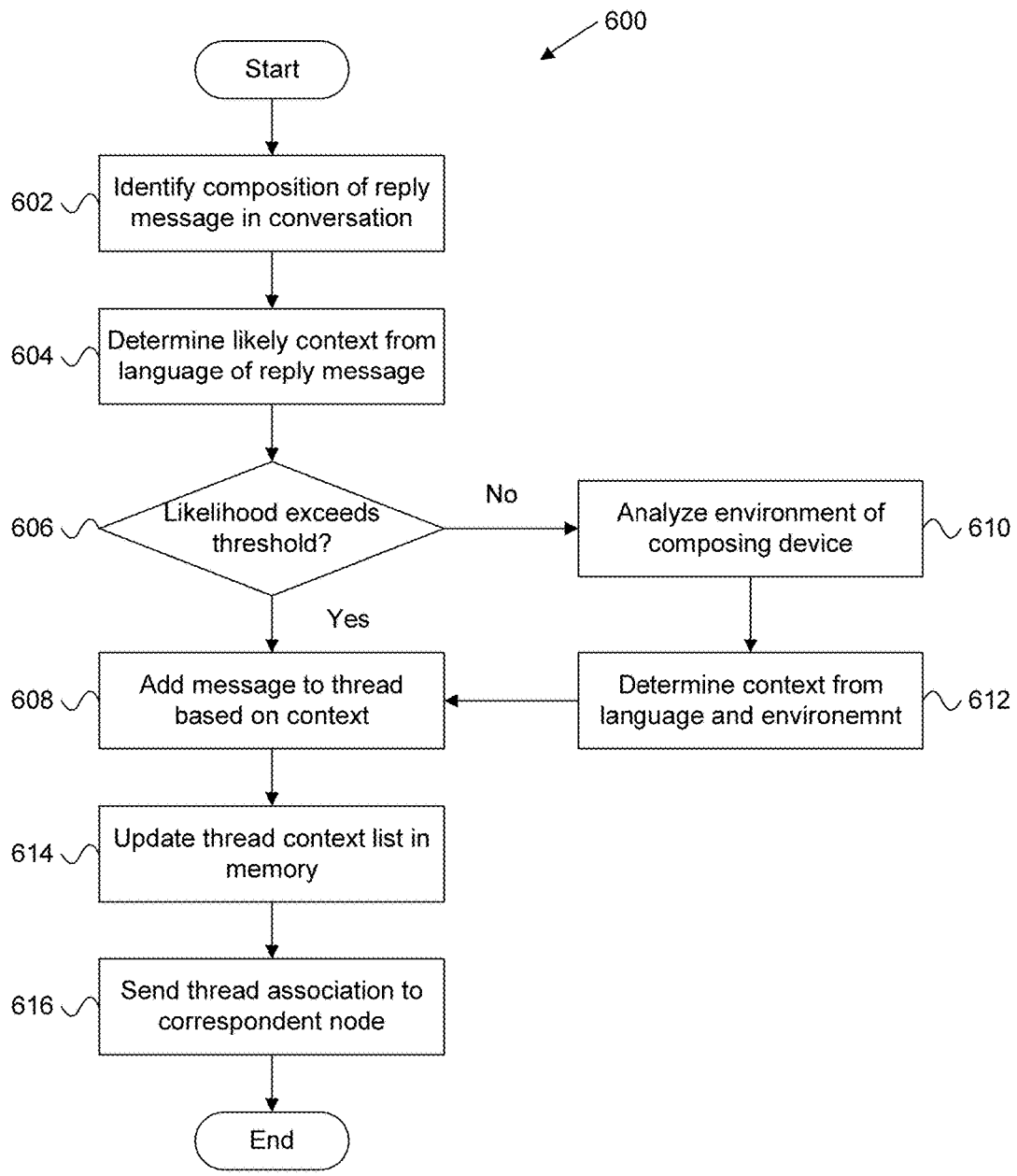
FIG. 6 is a schematic flow chart diagram illustrating another embodiment of a method for automatically aggregating text-based messages together based on context.

FIG. 6 depicts a method 600 for automatically aggregating text-based messages together based on context, according to embodiments of the disclosure. In some embodiments, the method 600 is performed using a messaging device, such as the contextual threading module 118, the contextual threading module 200, and/or the contextual threading device 300 described above with reference to FIGS. 1-2 and 3A-3D. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins with the messaging device identifying 602 composition of a reply message in a conversation. In some embodiments, identifying 602 composition of a reply message includes determining that a user is inputting text into a messaging client.

Next, the messaging device determines 604 likely context of the reply message based on language in the reply message. In some embodiments, determining 604 likely context of the reply message includes analyzing the language content using a natural language algorithm. The natural language algorithm, in one embodiment, uses probabilistic methods to identify one or more topics from the language content of the message. In some embodiments, determining 604 likely context of the reply message includes searching for keywords within the language content, the keywords being associated with particular contexts.

In some embodiments, determining 604 likely context of the reply message includes performing a syntactic analysis or a sematic analysis of the language content of the reply message. The syntactic analysis may involve parsing the reply message into discrete component, such as clause or phrases, and each component having a central idea (e.g., a keyword). The semantic analysis may involve identifying the central idea of each discrete component identified through the syntactic analysis.

The messaging device may then determine 606 whether a likelihood of the context exceeds a confidence threshold. If the context likelihood exceeds the confidence threshold, then the messaging device may add 608 the reply message to a conversation thread based on the context. Otherwise, if the context likelihood does not exceed the confidence threshold, then the messaging device may analyze 610 the environment of the composing device.

In some embodiments, adding 608 the reply message to a conversation thread may include adding the message to an existing conversation thread having messages with topics similar to (or same as) the message. In other embodiments, adding 608 the reply message to a conversation thread may include creating a new conversation thread and adding the reply message to the new thread in response to the topic of the reply message being sufficiently different than the topics of other messages in the conversation.

In some embodiments, analyzing 610 the environment includes capturing audio/visual data external to the messaging device and determining an external environment from the captured data. In some embodiments, analyzing 610 the environment includes identifying active applications and/or displayed content on the messaging device and determining an internal environment. Information on the environment may indicate a user's intent when composing the reply message.

In response to analyzing 610 the environment, the messaging device may determine 612 context of the reply message based on both the language content (previously examined) and the environment. Aspects of the language content and the environment are factors evaluated to determine 612 context of the reply message. In response to determining 612 context of the reply message, the messaging device proceeds to add 608 the message to a thread based on the context.

Next, the messaging device updates 614 a thread theme list stored in memory. In some embodiments, the thread theme list includes a primary theme of the thread and one or more secondary theme or sub-themes associated with the thread. In some embodiments, the thread theme list includes and identifier of messages belonging to the thread and/or determined context of the messages. In certain embodiments, updating 614 the thread theme list includes adding data regarding the reply message (i.e., context or identifiers) to the thread theme list. In certain embodiments, updating 614 the thread theme list includes updating themes associated with the thread based on the context of the reply message.

The messaging device then sends 616 information regarding the thread association to a correspondent node participating the conversation. The thread association indicates a particular thread to which the reply message is added. In some embodiments, the information may include thread identifier. The information may also include an indication that a new thread has been created. In certain embodiments, sending 616 information regarding the thread association includes pushing the thread association to a messaging client. In other embodiments, sending 616 information regarding the thread association includes uploading the thread association to a server. In some embodiments, sending 616 information regarding the thread association occurs concurrently with sending the reply message. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor, the code comprising:
code that identifies a conversation supporting a plurality of conversation threads, the conversation comprising a series of messages among two or more devices;
code that tracks eye movement;
code that determines a viewing location based on the eye movement;
code that determines a topic of a message in the conversation, wherein determining the topic is based on the onscreen content;
code that determines whether the topic matches an existing conversation thread of the conversation;
code that associates the message with the existing conversation thread in response to the topic matching;
code that creates a new conversation thread in the conversation in response to the topic not matching; and
code that visually distinguishes the conversation threads within the conversation.

2. The apparatus of claim 1, further comprising code that detects a reply message and automatically adds the reply message to a conversation thread based on context of the reply message.

3. The apparatus of claim 1, further comprising code that examines active applications on a device composing the message, wherein determining the topic is based on the active applications.

4. The apparatus of claim 1, further comprising code that associates the message with a particular conversation thread of the conversation based on user input.

5. The apparatus of claim 1, further comprising:
code that creates a data structure associating keywords with each conversation thread of the conversation; and
code that matches content in the message with keywords of the data structure, wherein determining the topic of the message is based on content in the message.

6. The apparatus of claim 1, wherein the code that determines the topic of a message comprises identifying an unanswered question and determining a likelihood that the message answers the unanswered question.

7. The apparatus of claim 1, wherein the code that determines the topic of a message comprises automatically determining the topic of a latest message in response to an action selected from the group comprising sending, receiving, and composing the latest message.

8. The apparatus of claim 1, wherein the apparatus comprises a device selected from the group consisting of: a receiving device, a sending device, and a messaging server.

9. A method comprising:
identifying, by use of a processor, a conversation supporting a plurality of message groupings, the conversation comprising a series of messages among two or more devices;
tracking eye movement;

determining a viewing location based on the eye movement;

identifying a topic of a message in the conversation, wherein determining the topic is based on the onscreen content;

determining whether the identified topic belongs to a message grouping of the conversation;

associating the message with the message grouping in response to determining that the message belongs to the message grouping;

creating a new message grouping in the conversation in response to determining that the message does not belong to an existing message grouping of the conversation; and visually distinguishing the conversation threads within the conversation.

10. The method of claim 9, wherein the message grouping is a conversation thread, the method further comprising:

associating the message with the new conversation thread in response to determining that the message does not belong to any conversation threads.

11. The method of claim 9, further comprising receiving audio data of a device composing the message, wherein identifying a topic of the message comprises identifying the topic based on the received audio data.

12. The method of claim 9, further comprising creating a context stack for the conversation, the context stack comprising context associated with each message of the conversation, wherein determining whether the identified topic belongs to a message grouping comprises searching the context stack for context matching the identified topic.

13. The method of claim 9, further comprising associating keywords with each message in the conversation, wherein determining whether the identified topic belongs to a message grouping comprises comparing the identified topic with the keywords.

14. The method of claim 9, wherein identifying a topic of the message comprises identifying a cursor location of a device composing the message.

15. The method of claim 9, wherein identifying a topic of the message comprises performing a natural language analysis of context of the message.

16. A program product comprising a computer readable storage medium that stores code executable by a processor, the executable code comprising code to perform:

identifying a latest message in conversation supporting a plurality of conversation threads, the conversation comprising a series of messages among two or more messaging devices;

tracking eye movement;

determining a viewing location based on the eye movement;

determining a topic of the latest message, wherein determining the topic is based on the onscreen content;

determining whether the topic matches an existing conversation thread of the conversation;

associating the latest message with the existing thread of the conversation in response to the topic matching;

creating a new conversation thread for the latest message in response to the topic not matching; and visually distinguishing the conversation threads within the conversation.

17. The program product of claim 16, the code further comprising identifying keywords for each of a plurality of threads associated with the conversation, wherein determining the topic comprises searching the message for keywords associated with a thread.

18. The program product of claim 16, wherein associating the latest message with a thread comprises:

calculating a likelihood that topic of the latest message matches a theme of each thread associated with the conversation;

identifying a particular thread having a highest calculated likelihood;

comparing the highest calculated likelihood to a threshold;

associating the latest message with the particular thread in response to the highest calculated likelihood exceeding the threshold; and associating the latest message with a new thread in response to the highest calculated likelihood not exceeding the threshold.

* * * * *